Oct. 1, 1929.                    C. R. BIRDSEY                    1,730,113
            MACHINE FOR AND PROCESS OF BUNDLING PLASTERBOARD UNITS OR THE LIKE
                            Filed Aug. 12, 1927        2 Sheets-Sheet 1
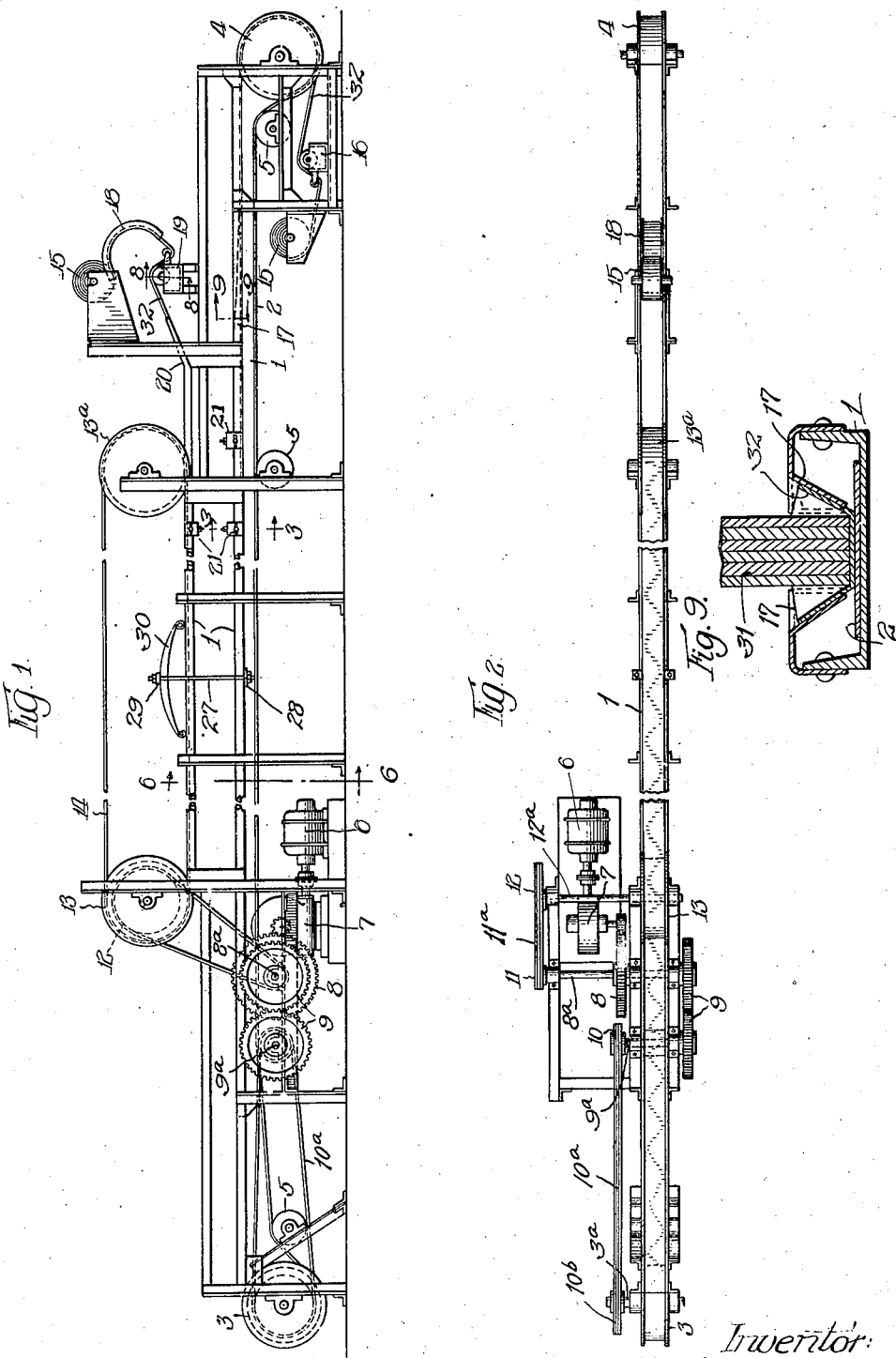
Inventor:
Charles R. Birdsey,
By Jones, Addington,
Ames & Seibold Attys

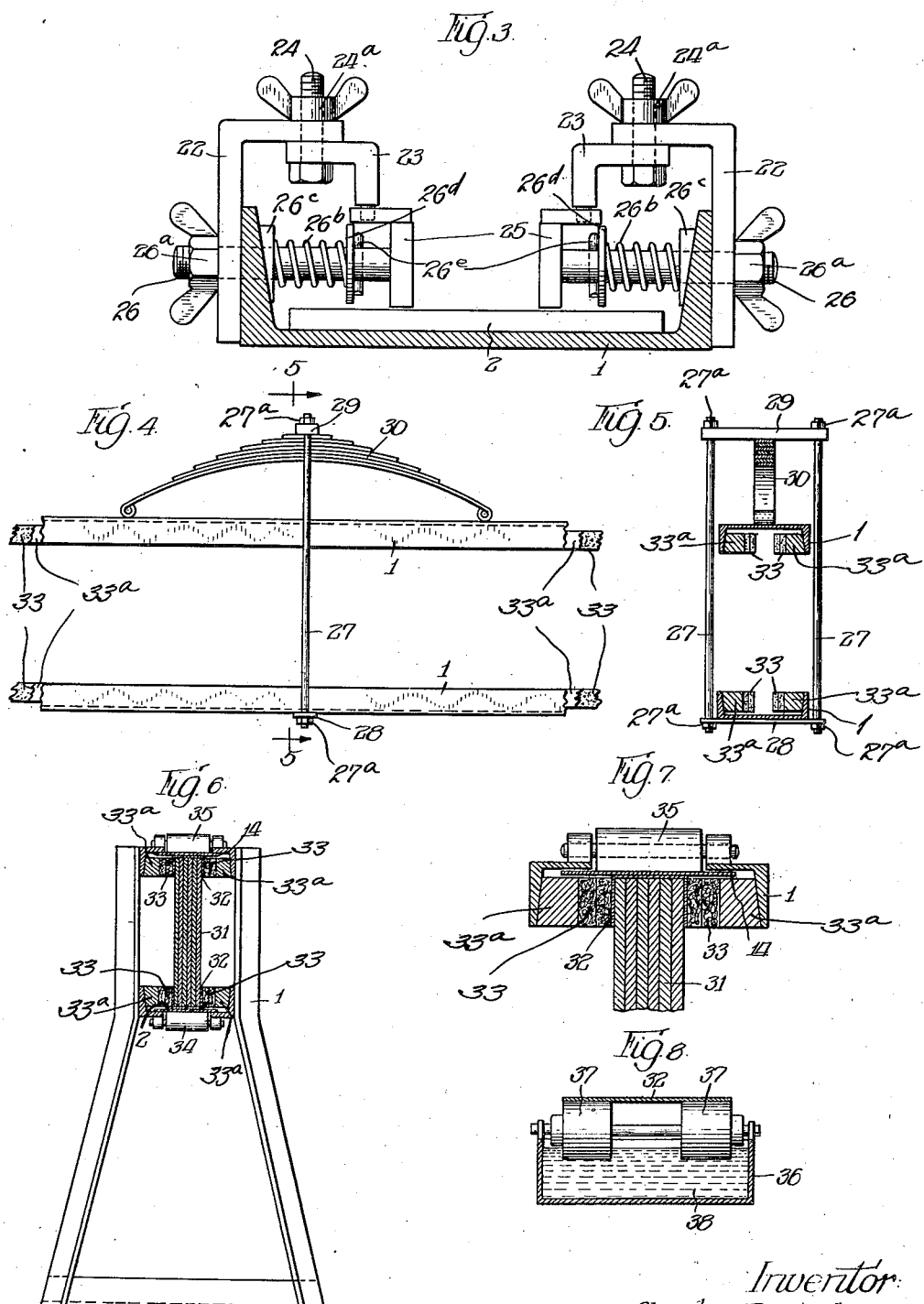

Patented Oct. 1, 1929

1,730,113

UNITED STATES PATENT OFFICE.

CHARLES R. BIRDSEY, OF HINSDALE, ILLINOIS, ASSIGNOR TO THE UNITED STATES GYPSUM CO., OF CHICAGO, ILLINOIS, A CORPORATION OF ILLINOIS

MACHINE FOR AND PROCESS OF BUNDLING PLASTERBOARD UNITS OR THE LIKE

Application filed August 12, 1927. Serial No. 212,529.

This invention relates to a machine for and process of bundling gypsum board or plasterboard units or the like, and has particular relation to such a machine and process whereby such bundles may be prepared in form suitable for shipment from the place of their manufacture to the place of their utilization in construction work or the like.

One object of the invention is to provide a machine and process for preparing bundles of the above-indicated character in such form that the finished edges of the boards will be protected during shipment and handling.

A further object of the invention is to provide a machine and process whereby bundles of the above-indicated character may be produced most economically by continuous operations.

Other objects and advantages of the invention will appear from a consideration of the following detailed description taken in connection with the accompanying drawings, in which:

Figure 1 is a side elevational view of a machine designed in accordance with this invention, only those parts essential to an understanding of the invention being shown;

Fig. 2 is a top plan view of the machine shown in Fig. 1;
Fig. 3 is an enlarged sectional view taken on the line 3—3 of Fig. 1, of parts designed to form the compact tight bundle produced by the machine and process of the present invention;
Fig. 4 is an enlarged fragmentary side elevational view of means designed to maintain pressure upon the edges of the bundles;

Fig. 5 is a vertical sectional view taken on the line 5—5 of Fig. 4;
Fig. 6 is an enlarged sectional view taken on the line 6—6 of Fig. 1;

Fig. 7 is a still further enlarged fragmentary sectional view, also taken on the line 6—6 of Fig. 1, and showing in greater detail certain of the parts shown in Fig. 6;

Fig. 8 is a fragmentary sectional view taken on the line 8—8 of Fig. 1, and showing in detail one of two pasters embodied in the machine; and Fig. 9 is a fragmentary sectional view taken on the line 9—9 of Fig. 1, and showing certain details of one of two devices for folding binding strips over the edges of the boards to be bundled.

The uses of the above mentioned parts will become more apparent from the following detailed description.

The machine consists of a suitable frame comprising a plurality of uprights carrying upper and lower channel members (1). These channel members are open or partly cut away at intervals to permit the operation of rollers (34 and 35), the function of which is described hereinafter. A main carrier belt (2) is driven by means of flanged pulleys (3 and 4) which are supported on the frame in suitable bearings. These pulleys are so disposed as to support the upper portion of the belt (2) to constitute a substantially horizontal tangent section passing inside the lower channel member (1) to feed the boards to be bundled through the machine with a continuous movement. Idler pulleys (5) that are also suitably journaled in the frame further support the belt (2) and maintain tension therein. A motor (6) operates a geared reducer (7) which in turn drives a geared wheel (8) that is secured to a shaft (8$^a$), to which one of two intermeshing gears (9) is also secured. By varying the ratio of the gear reducer the speed of operation of the machine can be changed as necessary. The other of the two gears (9) is secured to a shaft (9$^a$) carrying a pulley (10) which drives a belt or chain (10$^a$) to drive a pulley (10$^b$) that is secured to a shaft (3$^a$) which also carries the pulley (3). A pulley (11) is also attached to the shaft (8$^a$) and drives a pulley (12) by means of a belt or chain (11$^a$), the pulley (12) being secured to a shaft (12$^a$) to which a flanged pulley (13) is also secured. The pulley (13) drives an upper main belt (14) and an idler pulley (13ª) that is suitably journaled in the frame of the machine cooperates with said pulley (13) to support the belt (14) in a horizontal position with its lower tangent section running under and within the upper channel member (1).

Paper binding strips (32) are supplied from paper rolls (15), one upper and one lower. A guide (18) is used in connection with the upper paper strip to guide the paper from its roll to the upper paster (19) which supplies paste to the edges of said strip. A lower paster (16) similarly applies paste to the lower paper strip. The lower strip is formed into place by a shaper or former (17) which consists of a suitably bent piece of sheet metal fastened to the framework of the machine, as shown in Fig. 9, to turn up the pasted edge of the paper strip to engage the margins of the bundle. The upper strip passes through a similar former (20) which has a like action. Near the head of the machine, tension devices (21) are installed to form a compact bundle before and during the application of the paper binding strips.

These tension devices, as shown in Fig. 3, consist of stirrups (22) mounted on the channel bars (1) of the main frame and secured thereto by means of bolts (26) and wing nuts (26ª). These bolts respectively carry plates (25) which bear against the opposite edges of the bundle as it passes through the machine. This action is effected by coiled compression springs (26ᵇ) respectively disposed around the shanks of the bolts (26) and cooperating between bosses (26ᶜ) on the inner surfaces of the flanges of the channel members (1) and washers (26ᵈ) bearing against cotter pins (26ᵉ) extending through the shanks of said bolts, to bias said bolts and the plates (25) inwardly to a maximum extent limited by the adjustment of the wing nuts (26ª). The springs (26ᵇ) press the plates (25) against the opposite edges of the bundles passing through the machine with sufficient force to compact said bundles thoroughly. Attached to the stirrups (22) and adjustably secured thereto by means of bolts (24) and wing nuts (24ª) are spacer stirrups (23) which determine the maximum thickness of the bundles entering the machine and serve to center the bundles in the machine.

The upper channel member (1) is vertically slidable between the uprights of the frame of the machine and presses the lower tangent section of the upper belt (14) downwardly. Thus, when there are bundles in the machine, this section of the belt (14) is firmly pressed against the upper edges thereof and the lower edges of the bundles are correspondingly pressed against the lower belt (2). The upper and lower edges of the boards in each bundle are thus held securely in alignment to facilitate application of the binding strips (32) and setting of the adhesive by which said strips are applied, and the firm engagement of these edges by the belts (2 and 14) insures positive advancement of the bundles through the machine due to the movement of the belts.

When there are no bundles in the machine, the lower tangent section of the upper belt (14) may carry the entire weight of the upper channel member (1), or suitable rests (not shown) may be provided for said member to relieve the belt (14) of a portion of this load. The action of gravity upon the upper channel member (1) is augmented by a suitable leaf spring (30), the ends of which, as best shown in Fig. 4, bear downwardly upon the upper surface of the upper channel member (1) and a cross bar (29) bears upon the top of the spring (30) substantially at the middle thereof. Side rods (27) pass through suitable openings in the bar (29) near the respective ends thereof and extend downwardly through corresponding openings in a similar cross bar (28) underlying and bearing against the bottom of the lower channel member (1). Thus it will be seen that the spring (30) presses the floating upper channel member (1) downwardly to cause the lower tangent section of the upper main belt (14) to engage firmly the top edges of the bundles of boards passing through the machine. The force of this engagement may be regulated by adjusting nuts (27ª) engaging the extremities of the rods (27) which are screw-threaded for that purpose.

After the bundle has left the region of the tension device (21), it must be maintained in position and the paper strips along the edges must be held in place and the paste or glue be allowed to set. This is done, as shown in Fig. 6, by felt pads or strips (33) that are carried by elongated blocks or strips (33ª) of wood suitably secured to the inner surfaces of the flanges of the channel members (1). These felt pads or strips are sufficiently resilient to maintain the proper degree of compacting force on the bundles after the same have passed beyond the tension device.

Figs. 6 and 7 clearly show the arrangement of the parts of the machine whereby the lower main carrier belt (2) and the upper main belt (14) are respectively disposed within the lower and upper channels (1) to be freely movable longitudinally thereof. Rollers (34 and 35) are suitably journaled on the outer surfaces of the lower and upper channel members (1), respectively, and extend through openings or cut-away portions in the channel members to facilitate the movement of the belts (2 and 14), respectively, and also to press said belts against the bottom and top edges of the bundles moving through the machine. Fig. 7 shows in greater detail than Fig. 6 the construction whereby the felt pads (33) are caused to bear against the edges of the bundles of boards (31) to which the pasted portions of the binding strips (32) have been attached.

As shown in Fig. 8, each of the pasters (16 and 19) comprises a paste pot (36) containing suitable paste or glue (38) and rollers (37) so mounted as to continuously dip into or run partially submerged in the paste or glue. As the paper strip (32) passes over the rollers, paste is applied to the edges of the strip.

In operating my machine and practicing my process, the boards to be bundled are formed into loose segregated assemblies and placed in the machine in a vertical position resting on the lower main carrier belt (2). As the bundles advance due to the movement of this belt and the upper belt (14), they are compacted by the tension devices (21) into compact, tight form. The lower edges only of the bundles are engaged at first, the upper edges being engaged as the bundles pass further along. As the bundles are advanced, one of the paper strips (32) is drawn off the lower paper roll (15) and passes through the paster (16) and around the pulley (4) on the main driving belt with the wet pasted edges away from the belt and presented upwardly toward the bundle of boards.

The movement of the bundle draws the lower paper strip (32) through the former (17), which folds the paste bearing marginal portions of said strip over into firm contact with the lower marginal edges of the outer surfaces of the outside boards of the bundle. From the upper roll (15) a similar strip is drawn through the paster (19) and is similarly bent by the former (20) to engage the compressed upper edge of the compacted bundle just before the bundle passes under the upper main belt (14). As the bundles pass along the machine they are maintained in compact tight form by the felt pads (33) until the paste or glue on the strips (32) has set. The time allowed for such setting can be regulated either by lengthening the central portion of the machine or by reducing the rate of travel of the carrier belts.

As each bundle is freed from the upper belt, the paper strips are manually severed at the rearward end thereof and the formed bundles are taken from the machine individually.

As the edges of the bundles are released from compression, the natural resiliency of the boards causes a certain amount of spring which is sufficient to completely tighten the paper strips and produce a tight bundle which is convenient for handling and shipping. The paper binding strips are applied with sufficient tightness that, when the bundles spring as just described, there is not sufficient play to permit relative shifting of the various unit members within the bundle.

It is to be understood that the term "plasterboard or the like" as used herein comprehends all types of building material sheets or boards that are adapted to be bundled in the manner herein described, as, for example, gypsum-core boards adapted to be used in place of wood lathing and plaster covering, as well as boards adapted to be used in place of wood lathing only and to have finish coats of plaster applied thereto. The number of boards included in each bundle may be varied at will and is ordinarily determined by the size and weight of the individual boards, whereby each finished bundle is of such weight that it can be efficiently handled by a single workman.

My invention contains many novel features of proved economic value going to make up the composite results described in detail. And it is apparent from my detailed specification that some latitude exists for varying the application of my invention without departing substantially from its scope. Consequently, I do not wish to be limited in my own scope of application by the detailed variation of some of these steps of the composite process herein described.

Having thus described my invention, what I claim is—

1. In a machine of the kind described, means for engaging the top and bottom edges of loose assemblies of plaster-board units, or the like, in a vertical position to advance the same continuously; means for compacting said loose assemblies into tight compact engagement; means for supplying binding strips for certain of the edges thereof; means for applying a paste or glue to the edges of said binding strips; means for applying said binding strips to the said edges of said assemblies while the latter are in a compact tight form; and means for maintaining said assemblies in a compact tight form with the binding strips applied to the edges thereof until the paste or glue has become set; said combined means yielding composite, tight shippable packages.

2. In a bundling machine of the kind described for plasterboard or the like, in combination, a main driving belt designed to carry and advance segregated assemblies of board units; forming means to apply paper strips to the marginal edges of such segregated assemblies; means for compressing said assemblies into a compact, tight form in which substantially all the resiliency of the units is removed; means preceding the application of said paper strips for applying paste or glue to the edges thereof; and means for maintaining said assemblies in compact form until the paste or glue on said strips has become dry and set; said means in continuous operation producing tight, substantial, merchantable packages.

3. In a bundling machine of the kind described, for plasterboard or the like, in combination, a main driving belt designed to carry and advance segregated assemblies of board units, means for compressing the loosely-formed bundles into a compact, tight form in which substantially all the resiliency of the units is removed, forming means adapted to apply paper strips to the marginal edges of said segregated assemblies, means preceding the application of said strips for supplying an adhesive to secure said strips to said assemblies, and means for maintaining the assemblies in compact condition until the adhesive has set before separating the assemblies into individual unit packages or bundles.

4. In a bundling machine adapted to receive a continuous series of groups of plasterboards or the like, the boards of each group being disposed in face-to-face relation, means continuously moving for engaging the edges of the boards of each group to form a series of aligned bundles and to advance said bundles with a continuous movement, and means for applying binding strips to the opposite edges of said bundles during the continuous movement thereof.

5. In a bundling machine, continuously moving means for advancing a continuous series of bundles of plasterboards or the like and for aligning the edges of said boards, means for applying binder strips to the opposite edges of said series of bundles, means for folding said binder strips about the edges of said bundles to form flaps, means for compressing said bundles during the continuous movement thereof, and means for pressing said flaps against said bundles during the continuous movement thereof.

6. In a bundling machine, continuously moving means for engaging two opposite edges of a continuous series of groups of plasterboards or the like to advance such groups with a continuous motion, means for applying binder strips to opposite edges of said groups, means for applying an adhesive to said strips before application to said groups, means for folding adhesive-covered portions of said binding strips over the edges of said groups to form flaps attached to the surfaces of the outer boards in said groups and means for applying pressure to said flaps during the continuous movement of said groups to facilitate the setting of said adhesive.

7. In a bundling machine, an endless conveyor, means for imparting continuous motion to said conveyor to cause the forward movement of a series of bundles of plasterboards or the like, means for continuously applying binding strips to certain of the edges of said bundles, means for applying an adhesive to said binding strips before application to said bundles, means adapted to press said binding strips into contact with said bundles, and means for maintaining pressure upon said binding strips to cause the setting of said adhesive during the continuous movement of said bundles.

8. In a bundling machine, means for advancing a series of bundles of plasterboards or the like with a continuous movement, means for applying binding strips to the opposite edges of said series of bundles, means for applying an adhesive to said binding strips before application to said bundles, and continuous belts adapted to press against said binding strips after application to said bundles to facilitate the setting of said adhesive.

9. The process of producing compact, distributing bundles of plasterboards or the like, comprising continuously applying compacting force to two opposite edges only of a continuous series of loosely-packed assemblies of such boards to form bundles of non-shifting individual units and applying binding strips to said opposite edges of said bundles while the compacting force is applied thereto.

10. The method of packaging plasterboard units or the like comprising the forming of compact, tight, segregated assemblies of such units while in a vertical position, continuously advancing said assemblies by engagement with the top and bottom edges only thereof, applying paste or glue to the edges of tough, fibrous binding strips, applying said pasted binding strips to the opposite marginal edges of a continuous series of the compacted assemblies, and allowing these binding edges to become set before separating the series of compacted assemblies into individual unit packages or bundles.

11. In a machine of the class described, means for continuously advancing loose assemblies of plasterboard units or the like, means for applying compacting force to two opposite edges only of said loose assemblies, means for supplying binding strips for said compacted edges of said units, means for applying an adhesive to said binding strips, means for applying said binding strips to said compacted edges of said assemblies, and means for maintaining said edges of said assemblies compacted until the adhesive has become set, said combined means yielding composite, tight packages suitable for shipment.

12. In a bundling machine, means for continuously receiving plasterboards or the like in groups, each group comprising a plurality of such boards in face-to-face, loose arrangement, means for compressing two opposite edges only of said boards to form a continuous series of bundles, and means for applying fibrous binder strips by an adhesive to said opposite edges of said bundles while the same are maintained in compression.

13. In a bundling machine, means for continuously receiving plasterboards or the like in groups, each group comprising a plurality of such boards disposed in face-to-face relation, means for compressing two opposite edges only of such groups of boards to form a continuous series of bundles, means for advancing said bundles with a continuous movement, and means for applying fibrous binder strips to said compressed opposite edges of said bundles during the continuous movement thereof.

In witness whereof, I have hereunto subscribed my name.

CHARLES R. BIRDSEY.